ial Patent Office
3,015,652
Patented Jan. 2, 1962

3,015,652
PROCESS FOR THE PRODUCTION
OF POLYAMIDES
Hermann Schnell, Krefeld-Uerdingen, and Gerhard Fritz, Krefeld-Bockum, Germany, assignors to Farbenfabriken Bayer Aktiengesellschaft, Leverkusen, Germany, a corporation of Germany
No Drawing. Filed Aug. 6, 1957, Ser. No. 676,488
Claims priority, application Germany Aug. 18, 1956
4 Claims. (Cl. 260—78)

It is known to produce polyamides by polymerisation of anhydrous monomeric cyclic lactams having more than 6 ring members, in the presence of strongly basic catalysts for example alkali metals such as sodium and potassium, and alkali metal hydrides or alkaline earth metal hydrides such as lithium hydride and calcium hydride, at elevated temperatures. This process is generally termed "ionic polymerisation." As a rule, temperatures of above 200° C. preferably above 220° C., are required in order to obtain a marked increase in the reaction rate. Thus, for example, the polymerisation of caprolactam proceeds very slowly at 200° C. in the presence of catalytic quantities of sodium. The high molecular weight polyamide is formed in short reaction periods at approximately 240° C. only.

It has now been found that the ionic polymerisation of monomeric cyclic lactams with more than 6 ring members may be substantially accelerated and effected at a lower temperature by the addition of compounds selected from the group consisting of $O=C=NH_1$, $$R_2-N=C=N-R_3$$

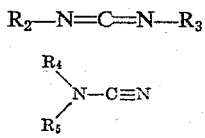

wherein $R_1$, $R_2$ and $R_3$ represent a monovalent, saturated, unsubstituted, unbranched or branched alkyl radical, a monovalent, unsubstituted cycloalkyl radical, a monovalent, unsubstituted or nucleus halogenated, unbranched or branched aralkyl radical, a monovalent, unsubstituted or nucleus halogenated aryl radical or a monovalent, unsubstituted or nucleus halogenated, unbranched or branched alkylaryl radical, and $R_4$ and $R_5$ the same radicals or hydrogen.

Compounds of this class are, for example, butylisocyanate, hexylisocyanate, octylisocyanate, cyclohexylisocyanate, phenylisocyanate, chlorophenylisocyanate, naphthylisocyanate, diisopropyl-carbodiimide, dibutyl-carbodiimide, dioctyl-carbodiimide, dicyclohexyl-carbodiimide, N,N - dimethyl - cyanamide, N - cyclohexyl - N - methylcyanamide, N,N-dicyclohexyl-cyanamide, N-phenyl-N-methyl-cyanamide or N,N-diphenyl-cyanamide, N,N-di-(chlorophenyl)-cyanamide, or compounds may be used which split off under the reaction conditions the aforesaid compounds such as the so-called isocyanate-splitters, e.g. dimer isocyanates [O. Bayer, Angewandte Chemie, A 59 (1947) 267].

Surprisingly, these compounds together with the known basic catalysts accelerate the polymerisation of lactams to such an extent that in comparison the reaction time is reduced at 250° C. to approximately one-quarter of the time required with the use as catalyst of for instance sodium only. Moreover, the polymerisation proceeds at an appreciable rate even at lower temperatures (e.g. at 120° C.) with addition of these compounds together with the basic catalysts.

The acceleration of the polymerisation by addition of the aforesaid compounds does not occur only with the use of strongly basic catalysts such as alkali or alkaline earth metals, alkali or alkaline earth metal hydrides, alkali or alkaline earth metal oxides and alkali or alkaline earth metal hydroxides, for instance lithium, sodium, potassium and calcium metal, lithium, sodium, potassium and calcium hydride or oxide or hydroxide, but it is also possible to polymerise lactams very rapidly to give high molecular weight products with the aid of weakly basic catalysts which per se are less active such as alkali and alkaline earth metal carbonates, bicarbonates, acetates and benzoates, for instance, the lithium, sodium, potassium or calcium carbonate, bicarbonate, acetate and benzoate or the alkali metal salts of aromatic hydroxy compounds.

Lactams suitable for the process are especially the ε-caprolactam, further, for example, the C-methyl-ε-caprolactam, the lactam of ω-amino-enanthic acid and the ω-capryllactam.

For carrying out the polymerisation according to the invention, pure and dry or molten lactam is mixed with one of the aforesaid compounds or with a mixture of several of such compounds, preferably in a proportion of about 0.001 to 4 percent by weight (referred to the quantity of lactam used) and with the alkaline reaction accelerator, and the mixture kept at the desired polymerisation temperature, whereby a rapid polymerisation of the lactam instantaneously sets in after a short period, rapidly proceeding to high degree of polymerization.

The following examples are given for the purpose of illustrating the invention.

*Example 1*

In a glass tube open at one end 0.1 part by weight of phenyl-isocyanate and subsequently 0.01 part by weight of metallic sodium are added to 25 parts by weight of dry ε-caprolactam at 130° C. The tube is then immersed in a bath heated to 250° C. and the mixture stirred with passing over a dry nitrogen. After 3 minutes, the melt becomes highly viscous. It may be drawn out into filaments of high strength.

A control experiment using the same quantity of sodium but without the addition of phenyl-isocyanate gives a highly viscous melt after 15 minutes only.

*Example 2*

A glass flask containing the same mixture as that described in Example 1 is immersed in a bath heated to 200° C. and the melt stirred while dry nitrogen is passed over it. After 7 minutes, the mixture is highly viscous and finally solidifies.

A control mixture containing no addition of phenyl-isocyanate, but treated otherwise under the same conditions, is still thinly liquid after 1 hour and does not show any noticeable polymerisation.

*Example 3*

30 parts by weight of pure and dry ε-caprolactam are added at 120° C. to 0.01 part of metallic sodium, and from this mixture 5 parts by weight of caprolactam are distilled over at 120° C. under vacuum to remove residual traces of moisture. Upon addition of 0.25 millilitres of phenyl-isocyanate, the melt is mixed at 120° C. with passing over of dry nitrogen. After 20 minutes the mixture is highly viscous and becomes solidified after a brief period.

In a control experiment without the addition of phenyl-isocyanate no noticeable polymerisation takes place after stirring for 4 hours.

*Example 4*

The starting mixture corresponds to that used in the experiment described in Example 2, with the exception that instead of phenyl-isocyanate, 0.25 parts by weight of diisophopyl-carbodiimide are added. After stirring at 200° C. for 10 minutes, the melt becomes highly viscous and then solid.

When 0.25 parts by weight of cyclohexyl-carbodiimide are used instead of diisopropyl-carbodiimide, the melt becomes highly viscous after stirring at 200° C. for 12 minutes and solid after a few minutes.

*Example 5*

25 parts by weight of pure and dry ε-caprolactam are treated at 130° C. with 0.25 parts by weight of N,N-diphenyl-cyanamide, 0.01 parts by weight of metallic sodium is then added. The mixture is subsequently stirred at 200° C. in an oil bath while passing dry nitrogen over it. After 27 minutes the melt is highly viscous and so solid after a short time that stirring is no longer possible.

*Example 6*

30 parts by weight of pure and dry ε-caprolactam are treated in a round-bottomed flask at 130° C. with 0.074 parts by weight of sodium bicarbonate, and 5 parts by weight of ε-caprolactam are distilled off at 130° C. under vacuum in order to remove any available residue of moisture. 0.01 part by weight of phenyl-isocyanate is then added, the flask placed in a bath heated to 250° C. and the mass stirred with passing of nitrogen over. After 20 minutes a highly viscous melt is thus obtained which may be drawn out into stretchable filaments with good fastness properties.

An experiment which is carried out in the same manner but without addition of phenyl-isocyanate does not show any noticeable polymerisation after stirring at 250° C. for 1 hour.

*Example 7*

In an experiment corresponding to that of example 6, 0.1 part by weight of the sodium salt of 4,4'-dihydroxy-diphenyl-2,2-propane is added as catalyst instead of the sodium bicarbonate but otherwise operating in the same manner. After stirring the mixture at 200° C. for 9 minutes with passing over of dry nitrogen, a highly viscous melt is formed. A control experiment without addition of phenyl-isocyanate does not yield a polymeric product after 1 hour.

*Example 8*

25 parts by weight of pure and dry ε-caprolactam are mixed in a flask at 130° C. with 0.25 parts by weight of phenyl-isocyanate, and 0.25 parts by weight of the sodium compound of cyanoacetic acid ethyl ester are then added and the mass is stirred at 250° C. with passing over of dry nitrogen. After 4 minutes only, a highly viscous melt is thus obtained.

A control experiment without addition of isocyanate under otherwise similar conditions yields a highly viscous melt of the polymer after 29 minutes.

*Example 9*

Under a stream of dry nitrogen and under stirring 35 parts by weight of ε-caprolactam are melted at 130° C. Then 0.064 parts by weight of sodium benzoate are added. Under vacuum 10 parts by weight of the lactam are distilled off. After the addition of 0.14 parts of naphthylisocyanate the mixture is stirred at 250° C. dry nitrogen. After 4 minutes only, a highly viscous melt

*Example 10*

One works as described in Example 9 but instead of 0.064 parts by weight of sodium benzoate, 0.04 parts by weight of dry waterfree sodium acetate, and instead of 0.14 parts of naphthyl isocyanate, 0.1 parts of phenyl isocyanate are used. After stirring the mixture at 250° C. for 8 minutes the melt is highly viscous.

*Example 11*

One works as described in Example 9 but instead of 0.064 parts by weight of sodium benzoate, 0.46 parts by weight of calcium hydride, and instead of 0.14 parts of naphthyl isocyanate, 0.25 parts of phenyl isocyanate are used. After stirring the melt at 250° C. for 23 minutes the melt is highly viscous.

*Example 12*

100 parts by weight of ε-caprolactam are treated as described in Example 9 under addition of 0.0035 parts by weight of lithium hydride and 0.35 parts of butyl isocyanate. After stirring the melt at 250° C. for 12 minutes the melt is highly viscous.

*Example 13*

One works as described in Example 9 but instead of 0.064 parts by weight of sodium benzoate 0.01 parts of sodium metal, and instead of 0.14 parts of naphthyl isocyanate, 0.25 parts by weight of dicyclohexylcarbodiimide are used. By treating the melt at 250° C. the melt is highly viscous after 17 minutes.

*Example 14*

50 parts by weight of ε-caprolactam are dissolved in 50 parts by weight of decahydronaphthalene. 0.02 parts by weight of sodium metal are added. The mixture is heated to 140° C. and under vacuum 15 parts by weight of dehahydronaphthalene are distilled off. Then 0.3 parts by weight of phenyl isocyanate are added. The solution is stirred at 180° C. After 40 minutes the polymer in form of a powder begins to precipitate.

*Example 15*

35 parts by weight of ε-caprolactam are melted in a stream of dry nitrogen at 130° C. Under stirring 0.01 parts by weight of sodium metal are added and under vacuum 10 parts by weight of the lactam are slowly distilled off. Then 0.1 parts by weight of dimer phenyl isocyanate are added and the temperature is increased at 200° C. After stirring for 6 minutes the melt becomes highly viscous and finally hard.

We claim:

1. The process for producing a polyamide by ionic polymerization of a lactam selected from the group consisting of ε-caprolactam, C-methyl-ε-caprolactam, the lactam of ω-aminoenanthic acid and the ω-capryl lactam, which comprises heating in the complete absence of water a mixture of said lactam, a basic lactam polymerization catalyst selected from the group consisting of alkali and alkaline earth metals, alkali and alkaline earth metal and hydrides, oxides, hydroxides and salts of weak acid compounds selected from the group consisting of carbonic acid, acetic acid, benzoic acid and 4,4'-dihydroxydiphenyl-2,2-propane, and an added accelerator selected from the group consisting of:

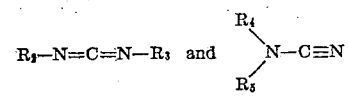

wherein $R_2$ and $R_3$ are radicals selected from the group consisting of alkyl with up to 8 carbon atoms, cycloalkyl, unsubstituted and nuclear halogenated phenyl and naphthyl and $R_4$ and $R_5$ are radicals selected from the group consisting of hydrogen and the same radicals defining $R_2$ and $R_3$, said basic catalyst being present in the mixture in amounts of about 0.003 to about 1.0 percent by weight of said lactam and said accelerator being present in the mixture in amounts from about 0.001 to about 4 percent by weight of said lactam, said heating step being carried out at polymerizing temperatures higher than about 120° C. until the desired degree of polymerization is obtained.

2. Process according to claim 1 wherein said accelerator is di-isopropylcarbodiimide.

3. Process according to claim 1 wherein said accelerator is di-cyclohexylcarbodiimide.

4. Process according to claim 1 wherein said accelerator is N,N-diphenylcyanamide.

References Cited in the file of this patent

UNITED STATES PATENTS 2,241,321   Schlack ------------------ May 6, 1941

OTHER REFERENCES

Ser. No. 323,512, Hagedorn (A.P.C.), published Apr. 20, 1943.

UNITED STATES PATENT OFFICE
CERTIFICATE OF CORRECTION

Patent No. 3,015,652 January 2, 1962

Hermann Schnell et al.

It is hereby certified that error appears in the above numbered patent requiring correction and that the said Letters Patent should read as corrected below.

Column 1, line 30, for the formula reading "$O=C=NH_1$" read -- $O=C=NR_1$ --; column 4, line 62, before "alkali" insert -- and --; same line 62, strike out "and", second occurrence.

Signed and sealed this 19th day of June 1962.

(SEAL)
Attest:

ERNEST W. SWIDER
Attesting Officer

DAVID L. LADD
Commissioner of Patents